United States Patent Office 2,791,740
Patented May 7, 1957

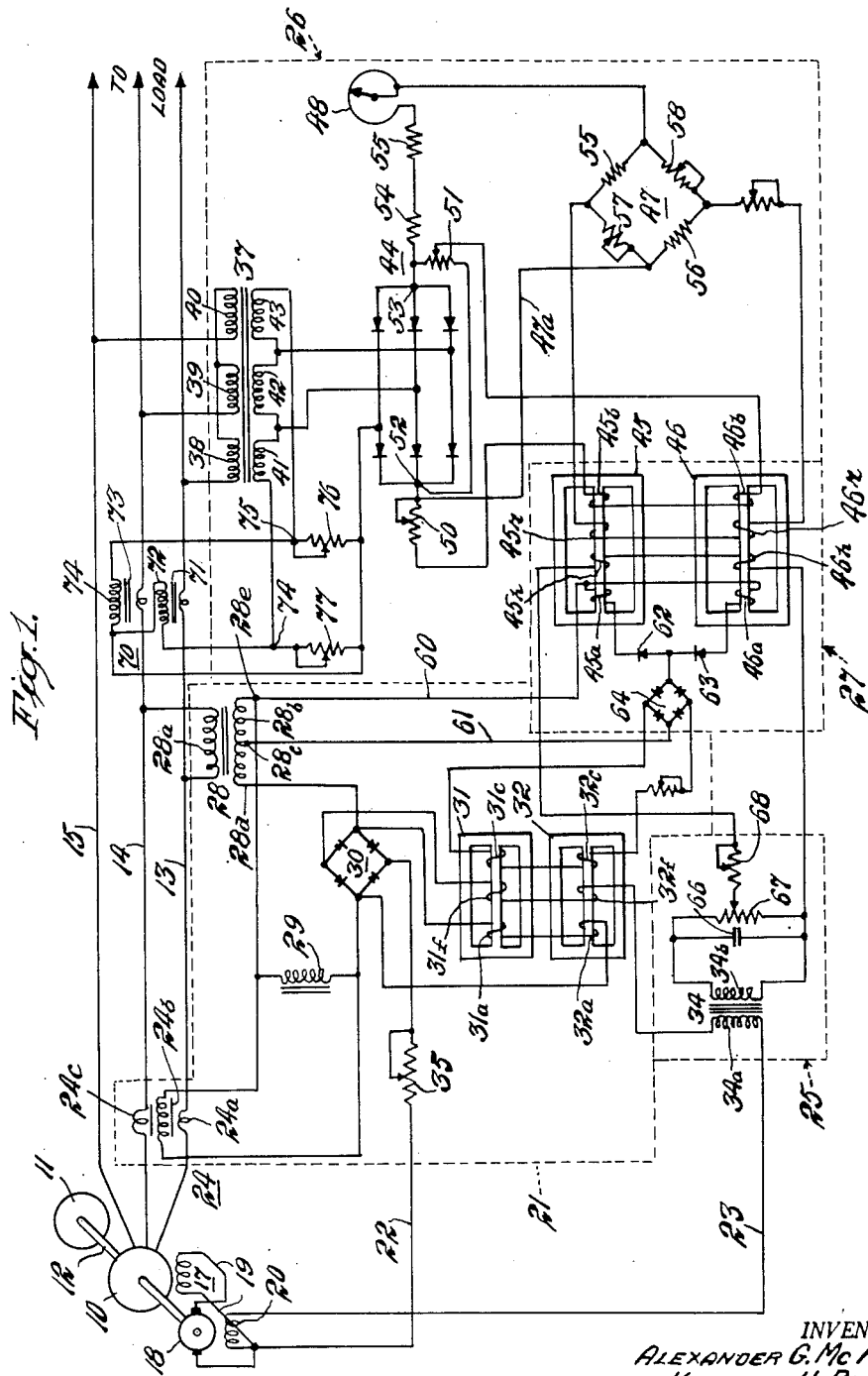

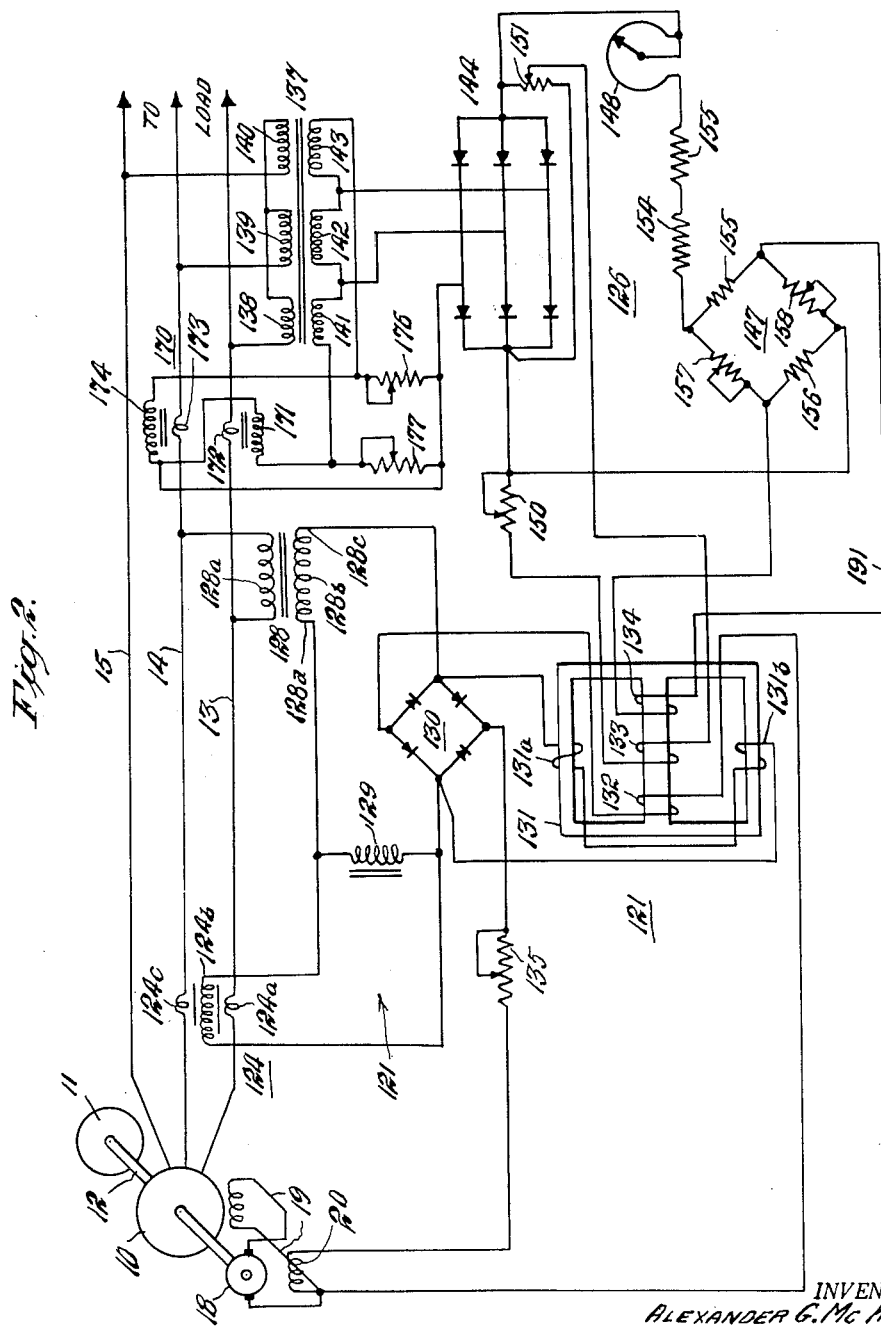

2,791,740

VOLTAGE REGULATOR

Alexander G. McKenna, Redondo Beach, Calif., and Kenneth H. Beeber, Mount Vernon, N. Y., assignors to Ward Leonard Electric Company, a corporation of New York Application October 20, 1953, Serial No. 387,288

13 Claims. (Cl. 322—24)

This invention relates to voltage regulators and is directed particularly to voltage regulators of the static type for alternating current generators.

An object of the invention is to provide voltage regulators of the static type that are small in size, light in weight and inexpensive to manufacture.

Another object of the invention is to provide voltage regulators that have a high accuracy, are frequency insensitive, and have a rapid transient recovery time.

Other and further objects will be apparent from the following specification taken in connection with the accompanying drawings in which:

Fig. 1 is a schematic diagram illustrating the circuit, and

Fig. 2 is a schematic diagram illustrating another embodiment of the invention.

The alternating current generator 10 is driven by a prime mover 11 such as an electric motor, internal combustion engine or the like through a shaft 12 to supply alternating current to the main power lines 13, 14, 15 connected to a load (not shown). The field winding 17 of the generator is supplied with field current from the exciter 18 through connecting leads 19. The exciter is also driven by shaft 12 and has a field winding 20 controlling the main field current generated by the exciter. The exciter field winding 20 is supplied with direct current by lines 22 and 23 from the voltage regulator.

The voltage regulator comprises a field power supply unit 21 furnishing direct current to the exciter field winding 20 from the rectifier 30. Rectifier input voltages is regulated by the current transformer 24, the potential transformer 28, the anti-hunt circuit 25, and the signal control circuit 26, through the amplifier circuit 27.

The field power supply comprises a power transformer 28 having a primary winding 28a connected across lines 13 and 14 and having a secondary winding 28b connected across reactor 29 and a full wave bridge rectifier 30 in series. The alternating current passes from the tap 28e through the reactor 29 and the rectifier 30 to the tap 28d. The primary windings 24a and 24c of the current transformer are connected in the lines 13 and 14, and the secondary winding 24b is coupled across the reactor 29 so that the alternating current from the current transformer 24 is nearly vectorially opposite the current from the power transformer 28. Thus, variations in the magnitude and vector relationship of the two currents will vary the voltage drop across the reactor 29. An increase of generator load current will cause an increased current in current transformer winding 24b and in reactor 29. This increased current reduces the voltage drop across reactor 29 which allows an increase of voltage applied to rectifier 30. The rectifier 30 output voltage is increased causing the required greater current in the exciter field. A change in the power factor of the load is detected by the two phase current transformer 24 which changes the vector relationship of currents and therefore the voltage drop in reactor 29. Hence, a decrease in the power factor of the load in the lagging direction is detected by the current transformer 24 which decreases the angle of the vector relationship of currents in reactor 29, thereby decreasing the voltage drop. This allows the voltage applied to rectifier 30 to increase, thus increasing the exciter field current the required amount. A decrease of generator load current or a shift of power factor in a leading direction will correspondingly increase the voltage drop in reactor 29, decrease the voltage applied to rectifier 30 and thereby decrease excited field current. Series resistor 35 allows adjustment of field power supply unit to correct for field resistance variations of production generators.

At no load the voltage drop in reactor 29 due to current from transformer 28 is in quadrature with the E. M. F. applied from transformer 28, so that the resultant voltage applied to the rectifier 30 lags the E. M. F. of transformer 28. With application of unity power factor load, a voltage drop is generated across reactor 29 due to current from two-phase current transformer 24. This voltage drop is in opposition to the voltage drop due to current from transformer 28. However, the two voltage drops are each nearly in quadrature with the voltage applied to rectifier 30 so that an appreciable reduction of the resultant of the two vectorial currents in reactor 29 causes only a very small change in voltage applied to rectifier 30. The net result of application of unity power factor load is a very small increase in the voltage applied to rectifier 30 with a decrease in the vector angle between the E. M. F. of transformer 28 and voltage applied to rectifier 30. With further increases of unity power factor load there is further rotation of the vectorial voltage applied to rectifier 30 toward a smaller phase angle between it and the E. M. F. of transformer 28. Hence, through the range of unity power factor load there is but a small net increase of voltage applied to the rectifier 30, and therefore, a small increase of exciter field current. This operational characteristic matches the machine requirements for a small increase of exciter field current with increase of unity power factor load.

However, the quadrature component of a lagging power factor load current causes a voltage drop across reactor 29 which is in quadrature also with the voltage drop across reactor 29 supplied by transformer 28. This quadrature component voltage drop therefore is in phase with the E. M. F. from transformer 28 and causes a net increase in the voltage applied to rectifier 30, causing an increase of exciter field current. An increase of a lagging quadrature load current causes the vector resultant of voltage drop in reactor 29 to rotate in a direction to increase the voltage applied to rectifier 30 as the power factor of the load decreases. This satisfies the machine requirement of appreciable increase of exciter field current with increase of lagging power factor load.

With the application of leading power factor load the direction of rotation of the vector relationship of reactor 29 is reversed from that due to a lagging power factor load with the resulting decrease of voltage applied to rectifier 30 with an increase of leading power factor quadrature component load current. This decreases the voltage applied to rectifier 30 and decreases the exciter field current which is in accord with the machine requirements for a reduction of exciter field current as the power factor of the load progresses in a leading direction.

A pair of saturable reactors 31, 32 are coupled to the rectifier 30 to provide a positive feedback and to provide for regulation of the exciter current by the signal circuit 26. The reactors have series connected anode windings 31a, 32a, in parallel with the input of the rectifier 30 to vary the current and the voltage drop in reactor 29, thus controlling the applied voltage across the rectifier. The output of the rectifier is connected to the exciter field winding current path formed by the series connected feedback windings 31f, 32f, primary winding 34a of the anti-hunt transformer 34, line 23, exciter field winding 20, line 22 and adjustable resistor 35.

The impedance of the saturable reactors is determined by the control windings 31c, 32c, respectively, and feedback windings 31f, 32f, respectively. A decrease in saturable impedance increases the anode current and because of increased voltage drop in reactor 29 reduces the exciter voltage. Direct current passes through the control windings 31c, 32c and feedback windings 31f, 32f. These windings are connected in flux opposition. A decrease in the saturating direct current through the control windings 31c, 32c raises the impedance, and an increase in the saturating direct current through the feedback windings 31f, 32f raises the impedance. The current in anode windings 31a and 32a is reduced upon an increase in exciter field current, which is positive feedback and acts to reduce the change of control current needed in windings 31c, 32c for a given voltage correction.

The control circuit 26 has a three-phase transformer 37 with primary windings 38, 39, 40 connected in a Y formation across the power lines 13, 14, 15 and secondary windings 41, 42, 43 connected to the three-phase rectifier 44. The output of the rectifier is connected to the magnetic amplifiers 45, 46 through the electrical reference bridge 47 and the regulator control rheostat 48.

The signal circuit basically comprises a circuit providing an electrical reference against which the generator output voltage is compared. The comparison occurs in the bridge 47 and is impressed on the magnetic amplifiers by means of the reference windings 45r, 46r. The bias windings 45b, 46b are connected in series with the resistor 50 and adjustably tapped to the resistor 51 connected across the output taps 52, 53 of the rectifier 44. The reference circuit comprises temperature compensating resistors 54, 55, voltage regulator rheostat 48, reference bridge 47, and line 47a. Temperature compensating resistors 54, 55 are made of temperature sensitive resistance material. The voltage drop across resistors 54, 55 varies with temperature and serves to compensate for the temperature sensitivity of the reference bridge 47, making the signal circuit nearly temperature insensitive. The reference bridge comprises thyrite elements 55, 56 on opposite legs and linear adjustable, resistors 57, 58 on the other opposite legs. The resistance of the thyrite element varies as a function of voltage as set forth in the equation $R = KE^N$ where K is a constant, R the resistance, E the voltage and N a number which may vary between $-2$ and $-7$. Therefore, the reference bridge is balanced only at one voltage for each setting of the linear resistors. The resistors 57, 58 are set to balance the bridge at a desired voltage within the range of the voltage regulator rheostat 48, to set the output of the bridge at zero when the line voltage is at the proper value. A rise of line voltage, or the applied voltage, above the set value causes the thyrite resistance to decrease. The bridge is unbalanced and a reference current flows creating the corrective action. A fall of line voltage, or applied voltage below the set value causes the thyrite resistance to increase. The bridge is unbalanced in the other direction and a reference current flows in the opposite direction through the windings 42r, 43r. A corrective action to raise the line voltage is impressed on the field power supply. The line voltage of the generator may be set by the voltage regulator rheostat.

The anode windings 45a, 46a are connected in parallel with one end connected to the secondary 28b by the line 60 and the other end connected by line 61 to the bridge rectifier 64 and the doubler rectifiers 62, 63. The output of the bridge rectifier 64 is connected to the control windings 31c, 32c of the field power supply.

An increase of line voltage above the set line voltage causes a reference current to flow in a direction that reduces the impedance of reactors 45, 47 and increases control current supplied to the saturable reactors 31, 32 to reduce the impedance of the reactors 31 and 32 and thereby lower the voltage across the rectifier 30. The lower rectifier voltage means lower excitation voltage. The line voltage then drops to the set value.

Correspondingly, when the line voltage falls, the impedance of the reactors 45, 46 is increased, the signal control current decreases, increasing the impedance of the anode windings 31a, 32a. The voltage across rectifier 30 increases and the exciter voltage increases restoring the line voltage to the set value.

The anti-hunt circuit 25 comprises a differentiating transformer 34 with a primary winding 34a connected in the exciter field current path and a secondary winding 34b coupled across anti-hunt winding 45h, 46h of reactor 45, 46 in series. The variations in exciter current are reflected in the anti-hunt windings as a transient negative feedback. The effect of the feedback signal is to modify the rate of change of the output current of the magnetic amplifiers 45, 46 to be compatible with the time constants of the combination of field power unit 21, exciters 18, 20 and alternator field 17. This results in a limitation of the surplus energy that can be accumulated in excess of that required in the magnetic circuits for maintenance of the desired line voltage. Hence, any tendency to oscillate or hunt is strongly damped yet the system is not restrained from responding very quickly to any departure of line voltage from set value. A condenser 66 is connected across the secondary winding to provide lead to the output to anticipate changes. Rheostats 67 and 68 are provided to adjust the parameters of the anti-hunt circuit.

In the output of the generator are the droop transformers 70 with windings 71, 72, 73, 74. The secondary widings 72, 74 are connected in shunt across the adjustable resistors 76, 77 respectively, which are in series with the windings 41, 43. The resistor 77 is connected between the transformer winding 41 and the rectifier 44 and resistor 76 is connected between the transformer winding 42 and the rectifier 44. The current through the resistors produces a voltage drop which is modified by a vectorial contribution from the windings 72, 74. The resultant signal causes a slight reduction of exciter field current and of line voltage. The voltage droop is introduced when there is a reactive power factor current flowing in the output of the generator. There is little or no droop at unity power factor.

In parallel operation the voltage droop under reactive load serves to reduce the exciter field current which in turn reduces the excitation of the alternator, causing the power factor of the alternator to shift toward unity power factor. This reduces the circulating reactive kva. between paralleled machines to a small value.

The voltage regulator has a high quality of performance and uses appreciably fewer and simpler circuits than those of conventional voltage regulators. It maintains closer regulation, good stability and rapid transient response. The few components provide a small, compact voltage regulator, which is inexpensive to manufacture and assemble. The close regulator of the voltage is accomplished. The unit provides a small compact unit which obtains better regulation than the more complex units manufactured in the past.

The use of the two-phase current transformer with a single secondary winding permits the internal combination of multiphase current vectors into a single phase output that is responsive to magnitude of the load, and to the power factor of the load of the generator. Corrective action is initiated instantly with a change of load condition.

The regulator may be modified to substantially smaller size with fewer components by the employment of saturable reactors of the type capable of providing a high degree of signal amplification and by use of a reference bridge of substantially higher power output. The use of high signal power coupled with high gain saturable reactors permits the elimination of the magnetic amplifier stage of the regulator. The elimination of the amplifier modifies the internal characteristics of the regulator sufficiently to allow the elimination of the anti-hunt circuit, in addition.

This regulator, as shown in Figure 2, consists of a field power supply unit 121, which is comprised of a field power rectifier 130, whose output from potential transformer 128 is regulated by the voltage drop across reactor 129 in series. A two-phase primary current transformer 124 has a single phase output winding 124b, which is responsive to both the magnitude and the power factor of the load. The vectorial relationship of currents from the current transformer winding 124b and from the transformer 128 is such that as the load on the generator increases or power factor decreases from unity in a lagging direction, the voltage drop across reactor 129 decreases, allowing a higher voltage to be impresesd on rectifier 130 and thus increasing exciter field current to the required amount.

Shunted across rectifier 130 is the high gain variable impedance saturable reactor 131 to provide positive feedback and to provide for regulation by sensing control circuit 126. The reactor 131 has the additive anode windings 131a, 131b connected across the rectifier 130 to vary the current and voltage drop in reactor 129. The impedance of reactor 131 is varied by the saturating direct currents in feedback winding 132, in the base field current winding 133, and in the control circuit winding 134. A saturating flux is set up by the saturating direct current in the base field winding 133, whose magnitude is set by rheostats 150, 151. The exciter field current from rectifier 130 flows through feedback winding 132 in flux opposition. Any increase in exciter field current increases the impedance of shunt reactor 131, which constitutes positive feedback and reduces the magnitude of signal required from sensing system 126, for control of generator voltage.

The sensing system 126 consists of thyrite reference bridge 147, temperature compensating resistors 154, 155, voltage regulator rheostat 148, three phase sensing rectifier 144, and three phase sensing transformer 137. The reference bridge 147 is set for zero output at rated line voltage. Any deviation of voltage from the set value causes the bridge 147 to become unbalanced and provides a corrective signal to control winding 134. A reduction of line voltage from set value causes the thyrite resistance value to increase, unbalances the bridge 147, and causes the current through lines 156, 157 to winding 134 in a direction to increase the impedance of reactor 134, reduce the voltage drop in reactor 129, causing an increased voltage to be applied to rectifier 130, thus increasing exciter field voltage and current, and raising generator voltage to the set value.

The droop circuit 160 operates in substantially the same manner as droop circuit 170 in the system shown in Fig. 1.

Modifications may be made in the circuit without departing from the principles of regulation. The series reactor 29 may be a resistor with readjustment of the field power phasing. Magnetic amplifiers may replace the saturable reactors 31, 32. Amplifiers of the semi-conductor type, such as transistors, may replace the magnetic amplifiers 45, 46.

The signal circuit reference bridge may be modified to use other semi-conductor circuits such as the thermistor, and other types of semi-conductors. The entire signal circuit may be modified to allow use of a constant current or voltage device, such as a constant voltage transformer, as a reference whose output, compared to line voltage results in an error signal which initiates corrective action.

Various other modifications and changes may be made without departing from the scope of the invention.

We claim:

1. A voltage regulator for maintaining at a desired value the output voltage of an alternating current generator supplied with field winding current from an exciter having a field winding comprising a field winding circuit including said exciter field winding, load compounding means including a direct current supply means in series therewith to create a direct current in response to vectorial differences of the currents through the supply means and said load compounding means, and control means connected in parallel with said supply means to vary said direct current in response to departure of said generator voltage from the desired value and to restore the generator voltage to said desired value.

2. A voltage regulator for maintaining at a desired value the output voltage of an alternating current generator supplied with field winding current from an exciter having a field winding and comprising a field winding circuit including said exciter field winding, direct current supply means connected to said field winding circuit to supply direct current thereto, load compounding means having impedance means in series with the input of said direct current supply circuit and coupled to the output of the generator for receiving a current responsive to the load current to control the direct current in response to vectorial differences of the alternating current supplied to the input of said supply means and the load responsive current, and a signal circuit inherently providing a fixed reference for comparison with the generator output voltage to produce a departure signal on variation of said generator voltage from said desired value, means for coupling said circuit in parallel with said supply means to vary the exciter field winding current in response to said departure signal to restore the generator voltage to said desired value.

3. A voltage regulator as claimed in claim 2 wherein said direct current supply means comprises transformer means coupled to the output of said generator to provide an alternating supply and rectifying means having an input receiving alternating current and an output connected to said field winding circuit to supply direct current to said exciter field winding.

4. A voltage regulator as claimed in claim 3 wherein said impedance means is connected in series between the transformer means to conduct the alternating supply current to the input of the rectifying means to affect the voltage distribution, and said load compounding means has a current transformer connected to the output of the generator and in parallel with the impedance means to impress an alternating compounding current therethrough to vectorially combine at a ninety degree phase difference with said supply current at unity power factor and at a power factor other than unity proportionately changing the exciter supply current.

5. A voltage regulator as claimed in claim 4 wherein said impedance means is a reactor.

6. A voltage regulator as claimed in claim 5 wherein said means for coupling include a pair of saturable reactors having series connected anode windings connected across the input of said rectifying means and feedback windings connected in series in the exciter field winding circuit to provide a positive feedback to augment the differential of the exciter supply current under condition of varying load power factor.

7. A voltage regulator as claimed in claim 6 wherein said signal circuit comprises a second rectifying means coupled to the output of the generator, a reference bridge having adjustable resistors on opposite sides of said bridge and resistors on the other opposite sides having resistances varying with the voltage across said bridge to change the balance of the bridge.

8. A voltage regulator as claimed in claim 7 wherein control windings for changing the impedance of said anode windings are provided on said saturable reactors, and said signal circuit has magnetic amplifiers with control windings and anode windings, rectifier means for coupling said anode windings to said control windings, and said signal circuit control windings connected to the output of said reference bridge to receive said departure signal having a polarity depending on the departure of said output voltage from the desired value.

9. A voltage regulator as claimed in claim 8 wherein a rheostat is provided in series with the input of said bridge circuit and said adjustable resistors are set to balance said bridge within the voltage range impressed by said rheostat corresponding to the desired value of the output voltage.

10. A voltage regulator as claimed in claim 9 wherein resistor means are provided in the input of said second rectifying means, droop transformers coupled to the output of the generator and having secondaries coupled across said resistor means to vectorially modify the voltage impressed on said second rectifying means to adjust line voltage for apportioning the load between parallel generators.

11. A voltage regulator as claimed in claim 9 wherein an anti-hunt circuit having a filtering and lead producing condenser in the output is provided connected between the exciter field winding circuit and the magnetic amplifier to provide a transient negative feedback.

12. A high accuracy voltage regulator for maintaining at a desired value the output voltage of an alternating current generator supplied with field winding current from an exciter having a field winding comprising a first transformer having a primary winding connected to the output of said generator and a secondary winding, full wave bridge rectifier connected to said secondary winding, a load compounding means comprising a current transformer connected to the output of said generator and a reactor in parallel therewith and connected in series with said rectifier to vary the voltage across said rectifier in response to vectorial differences between the current from said first transformer and the current from said current transformer, saturable reactors having series connected anode windings connected in shunt across said rectifier to alter the voltage across said rectifier on change of impedance of said anode windings and having control windings for changing the impedance of said anode windings, a third transformer and a second rectifier for providing direct current changing with the output voltage, bridge having non-linear resistors on opposite sides and adjustable linear resistors on the other opposite sides connected across the output of said control windings of said saturable reactors and having control windings connected in series across the output of said bridge, said bridge being balanced at the desired output voltage value and unbalanced on departures from said values to impress a current having a polarity depending on the direction of unbalance, said magnetic amplifiers impressing a current varying in magnitude to alter the impedance of the anode winding in response to changes of the reference current, and an exciter field winding circuit connected across the output of said first rectifier to receive a direct current for correcting the generator voltage on a departure from the desired value.

13. A high accuracy voltage regulator for maintaining at a desired value the output voltage of an alternating current generator with field winding current supplied from an exciter having a field winding comprising a field winding circuit including said exciter field winding direct current supply means having rectifying means connected to said field winding circuit and transformer means coupled between said generator and said rectifying means to provide a direct current to said field winding from the alternating supply current of said transformer, load compounding means having a current transformer and an impedance connected across said current transformer and in series between the supply transformer and the rectifying means to affect the voltage distribution between said impedance and said rectifying means, said impedance passing the supply current and the compounding current from said current transformer to vectorially combine said currents at ninety degree phase difference at unity power factor and at a lagging power factor to vectorially combine at greater than ninety degrees to vary the exciter supply current and to proportionally increase the exciter supply circuit.

References Cited in the file of this patent

UNITED STATES PATENTS 2,672,585  Hostson _____ Mar. 16, 1954